(12) United States Patent
Takizawa

(10) Patent No.: US 10,119,823 B2
(45) Date of Patent: Nov. 6, 2018

(54) ANGULAR VELOCITY SENSOR, ELECTRONIC APPARATUS, AND MOBILE OBJECT

(71) Applicant: Seiko Epson Corporation, Tokyo (JP)

(72) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 174 days.

(21) Appl. No.: 14/689,450

(22) Filed: Apr. 17, 2015

(65) Prior Publication Data
US 2015/0300821 A1    Oct. 22, 2015

(30) Foreign Application Priority Data
Apr. 22, 2014 (JP) ................. 2014-087981

(51) Int. Cl.
*G01C 19/574* (2012.01)

(52) U.S. Cl.
CPC ................. *G01C 19/574* (2013.01)

(58) Field of Classification Search
CPC .. G01C 19/574; G01C 19/5712; F16F 9/3207
USPC ........................ 73/504.12; 181/121
See application file for complete search history.

(56) References Cited

U.S. PATENT DOCUMENTS

| | | | |
|---|---|---|---|
| 6,134,961 A | 10/2000 | Touge et al. | |
| 7,250,112 B2 | 7/2007 | Nasiri et al. | |
| 8,011,244 B2 | 9/2011 | Diem | |
| 8,261,614 B2 | 9/2012 | Hartmann et al. | |
| 8,459,110 B2 | 6/2013 | Cazzaniga et al. | |
| 8,534,127 B2 | 9/2013 | Seeger et al. | |
| 8,616,057 B1 | 12/2013 | Mao | |
| 2003/0131664 A1 | 7/2003 | Mochida et al. | |

(Continued)

FOREIGN PATENT DOCUMENTS

| | | |
|---|---|---|
| EP | 2056068 A1 | 5/2009 |
| EP | 2339293 A1 | 6/2011 |

(Continued)

OTHER PUBLICATIONS

Extended European Search Report for Application No. EP 15 16 4203 dated Sep. 10, 2015 (7 pages).

(Continued)

*Primary Examiner* — Lisa Caputo
*Assistant Examiner* — Irving A Campbell
(74) *Attorney, Agent, or Firm* — Harness, Dickey & Pierce, P.L.C.

(57) ABSTRACT

An angular velocity sensor includes a substrate; a plurality of mass units which is disposed above the substrate; respective coupling units which couple the respective mass units (a first mass unit and a third mass unit, the third mass unit and a second mass unit, the second mass unit and a fourth mass unit, and a fourth mass unit and the first mass unit) adjacent to each other, among the plurality of mass units; and respective drive units which are disposed above the substrate and are connected to the respective coupling units, and the respective drive units drive the respective mass units (the first mass unit and the third mass unit, the third mass unit and the second mass unit, the second mass unit and the fourth mass unit, and the fourth mass unit and the first mass unit) adjacent to each other through the respective coupling units.

22 Claims, 15 Drawing Sheets

(56) References Cited

U.S. PATENT DOCUMENTS

| | | | |
|---|---|---|---|
| 2007/0245826 A1 | 10/2007 | Cardarelli | |
| 2008/0202237 A1 | 8/2008 | Hammerschmidt | |
| 2010/0263446 A1 | 10/2010 | Tamura et al. | |
| 2012/0042728 A1* | 2/2012 | Hammer | B81B 3/007 73/504.12 |
| 2012/0061172 A1 | 3/2012 | Yacine | |
| 2012/0125099 A1 | 5/2012 | Scheben et al. | |
| 2012/0291548 A1* | 11/2012 | Kanemoto | G01C 19/574 73/504.12 |

FOREIGN PATENT DOCUMENTS

| | | |
|---|---|---|
| JP | 2000-009474 A | 1/2000 |
| JP | 2009-520950 A | 5/2009 |
| JP | 2009-520970 A | 5/2009 |
| JP | 2009-529666 A | 8/2009 |
| JP | 2010-096538 A | 4/2010 |

OTHER PUBLICATIONS

Extended European Search Report for Application No. EP15164203.0 dated Jan. 20, 2016 (16 pages).

* cited by examiner

ANGULAR VELOCITY SENSOR, ELECTRONIC APPARATUS, AND MOBILE OBJECT

BACKGROUND

1. Technical Field

The present invention relates to an angular velocity sensor, an electronic apparatus and a mobile object which include the angular velocity sensor.

2. Related Art

In the related art, a gyroscope (hereinafter, referred to as an angular velocity sensor) with a configuration in which a plurality of drive masses (hereinafter, referred to as mass units) disposed on a substrate as an angular velocity sensor corresponding to angular velocities of three detection axis rotations are coupled to each other by elastic coupling elements (hereinafter, referred to as coupling units), at least one mass unit is subjected to drive movement (hereinafter, referred to as drive vibration) by a drive unit, and thereby the drive vibration is transferred to another mass unit through the coupling unit, further, in a state in which a plurality of mass units is subjected to the drive vibration, angular velocity which is applied thereto is detected using detection vibration of detection units which are provided in a plurality of mass units, is known (for example, refer to European Patent Application Publication No. 2339293).

In an embodiment, the angular velocity sensor has a configuration in which two mass units (hereinafter, referred to as first mass pair) are subjected to drive vibration directly by a drive unit, thereby the drive vibration is transferred with a given rate to the other two mass units (hereinafter, referred to as second mass pair) through a coupling unit, and a total of four mass units is subjected to the drive vibration.

However, there is a possibility that, in the angular velocity sensor, the given rate may not be approximately 1:1 due to consumption of drive vibration energy or the like caused by, for example, a coupling unit having elasticity.

For this reason, there is a possibility that, in the angular velocity sensor, an amplitude of the drive vibration of the second mass pair to which the drive vibration is transferred from the first mass pair through the coupling unit may be smaller than an amplitude of the first mass pair which is subjected to drive vibration directly by a drive unit.

As a result, there is a possibility that, in the angular velocity sensor, an amplitude of detection vibration of a detection unit of the second mass pair at the time of applying angular velocity may be smaller than an amplitude of a detection unit of the first mass pair, and thus there may be a difference between detection sensitivities of detection axis rotation of each of three detection axis rotation angular velocities which are detected by detection units of the four mass units.

Due to this, there is a possibility that detection characteristics of the angular velocity sensor may be degraded.

SUMMARY

An advantage of some aspects of the invention can be realized by the following forms or application examples.

APPLICATION EXAMPLE 1

According to this application example, there is provided an angular velocity sensor including a substrate; a plurality of mass units which is disposed on the substrate; coupling units which couple the mass units that are adjacent to each other, among the plurality of mass units; and drive units which are disposed on the substrate and are connected to the coupling units, in which the drive units respectively drive the mass units that are adjacent to each other through the coupling units.

In this application example, the angular velocity sensor includes the coupling units which couple the mass units that are adjacent to each other, and the moving units which are connected to the coupling units. Also, the drive units respectively drive the mass units that are adjacent to each other through the coupling units.

By doing this, the angular velocity sensor can substantially equally drive the mass units that are adjacent to each other, and thus it is possible to make an amount of displacement (for example, amplitude of drive vibration) of the mass units at the time of driving substantially equal to each other.

As a result, for example, the angular velocity sensor can make an amount of displacement (for example, amplitude of detection vibration) of the mass units at the time of detecting angular velocity substantially equal to each other, and thus it is possible to reduce a difference of detection sensitivity of angular velocity between the respective detection axes.

By doing this, the angular velocity sensor can improve detection characteristics of angular velocity.

APPLICATION EXAMPLE 2

In the angular velocity sensor according to the application example, it is preferable that the plurality of mass units includes a first mass pair in which two of the mass units are disposed so as to face each other along a first axis, and a second mass pair in which the other two of the mass units are disposed so as to face each other along a second axis that intersects the first axis in a planar view. Also, it is preferable that the drive units drive the respective mass units such that the second mass pair is displaced in a direction that separates the pair from each other, when the first mass pair is displaced in a direction that brings the pair toward each other, and such that the second mass pair is displaced in a direction that brings the pair toward each other, when the first mass pair is displaced in a direction that separates the pair from each other.

In this example, the drive units of the angular velocity sensor drive the respective mass units such that the second mass pair is displaced in a direction that separates the pair from each other, when the first mass pair is displaced in a direction that brings the pair toward each other, and such that the second mass pair is displaced in a direction that brings the pair toward each other, when the first mass pair is displaced in a direction that separates the pair from each other.

As a result, the displacement method (in other words, vibration mode of drive vibration) of the respective mass units at the time of driving is defined by the drive unit, and thus, for example, the angular velocity sensor can suppress generation of an unnecessary vibration mode at the time of driving.

By doing this, for example, the angular velocity sensor can omit or simplify a frequency control used for limiting the unnecessary vibration mode.

APPLICATION EXAMPLE 3

In the angular velocity sensor according to the application example, it is preferable that at least the one of mass units of the first mass pair includes a first detection unit which detects angular velocity of a second axis rotation, at least the one of mass units of the second mass pair includes a second detection unit which detects angular velocity of a first axis rotation, and at least one mass unit of at least the one of the first mass pair and the second mass pair includes a third detection unit which detects angular velocity of a third axis rotation which intersects a flat plane along the first axis and the second axis.

In this application example, the angular velocity sensor can reduce a difference in detection sensitivity between the respective detection axes (first axis to third axis) using the respective detection units and can detect the angular velocity of three detection axis rotations.

APPLICATION EXAMPLE 4

In the angular velocity sensor according to the application example, it is preferable that at least one of the plurality of mass units includes a monitoring unit which monitors displacement of the mass unit at the time of driving.

In this application example, since at least one of the mass units includes a monitoring unit which monitors displacement of the mass unit at the time of driving, the angular velocity sensor can maintain an amount of displacement at the time of driving the respective mass units at a predetermined level, for example, by electromechanically converting the displacement, amplifying the displacement, and applying the displacement to the drive unit.

As a result, drive states of the respective mass units become stable, and thus the angular velocity sensor can improve the detection characteristics of angular velocity.

APPLICATION EXAMPLE 5

In the angular velocity sensor according to the application example, it is preferable that the coupling unit is formed in an arc shape having the center thereof between the mass units that are adjacent to each other, the drive unit includes a fixing unit that includes the center of the arc shape and is fixed to the substrate and a moving unit which connects the fixing unit to the coupling unit, and the moving unit and the coupling unit can rotate using the fixing unit as the center thereof.

In this application example, the coupling unit of the angular velocity sensor is formed in an arc shape, the angular velocity sensor includes a drive unit including a fixing unit which is fixed on the substrate, and a moving unit which connects the fixing unit to the coupling unit, and the moving unit and the coupling unit can rotate using the fixing unit as the center thereof.

As a result, in the angular velocity sensor, the drive unit can smoothly drive the respective mass units through the coupling unit.

APPLICATION EXAMPLE 6

In the angular velocity sensor according to the application example, it is preferable that the drive unit includes a fixing electrode which is provided on the substrate and a moving electrode which is provided in the moving unit, the fixing electrode and the moving electrode include electrode fingers which mesh with each other and have a comb tooth shape, and the electrode fingers are formed in an arc shape having the fixing unit as the center thereof.

In this application example, the fixing electrode and the moving electrode of the drive units include electrode fingers of a comb shape meshing with each other, the electrode fingers are formed in an arc shape using the fixing unit as the center thereof, and thus the angular velocity sensor can smoothly rotate the moving unit and the coupling unit using the fixing unit as the center thereof.

APPLICATION EXAMPLE 7

In the angular velocity sensor according to the application example, it is preferable that the coupling unit includes a stress reduction unit in a connection unit between the coupling unit and the mass unit.

In this application example, the coupling unit includes a stress reduction unit in a connection unit between the coupling unit and the mass unit, and thus, the angular velocity sensor can reduce concentration of the stress occurring in the connection unit between the coupling unit and the mass unit at the time of driving.

APPLICATION EXAMPLE 8

According to this application example, there is provided an electronic apparatus including the angular velocity sensor which is described in any one of the application examples.

In this application example, an electronic apparatus of the present configuration includes the angular velocity sensor which is described in any one of the above-described application examples, and thus an electronic apparatus which obtains the effects that are described in any one of the above-described application examples can be provided.

APPLICATION EXAMPLE 9

According to this application example, there is provided a mobile object including the angular velocity sensor which is described in any one of the application examples.

In this application example, a mobile object of the present configuration includes the angular velocity sensor which is described in any one of the above-described application examples, and thus a mobile object which obtains the effects that are described in any one of the above-described application examples can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments in which the invention is specified will be described with reference to the drawings.

First Embodiment

An angular velocity sensor according to a first embodiment will be first described.

Figure 1:
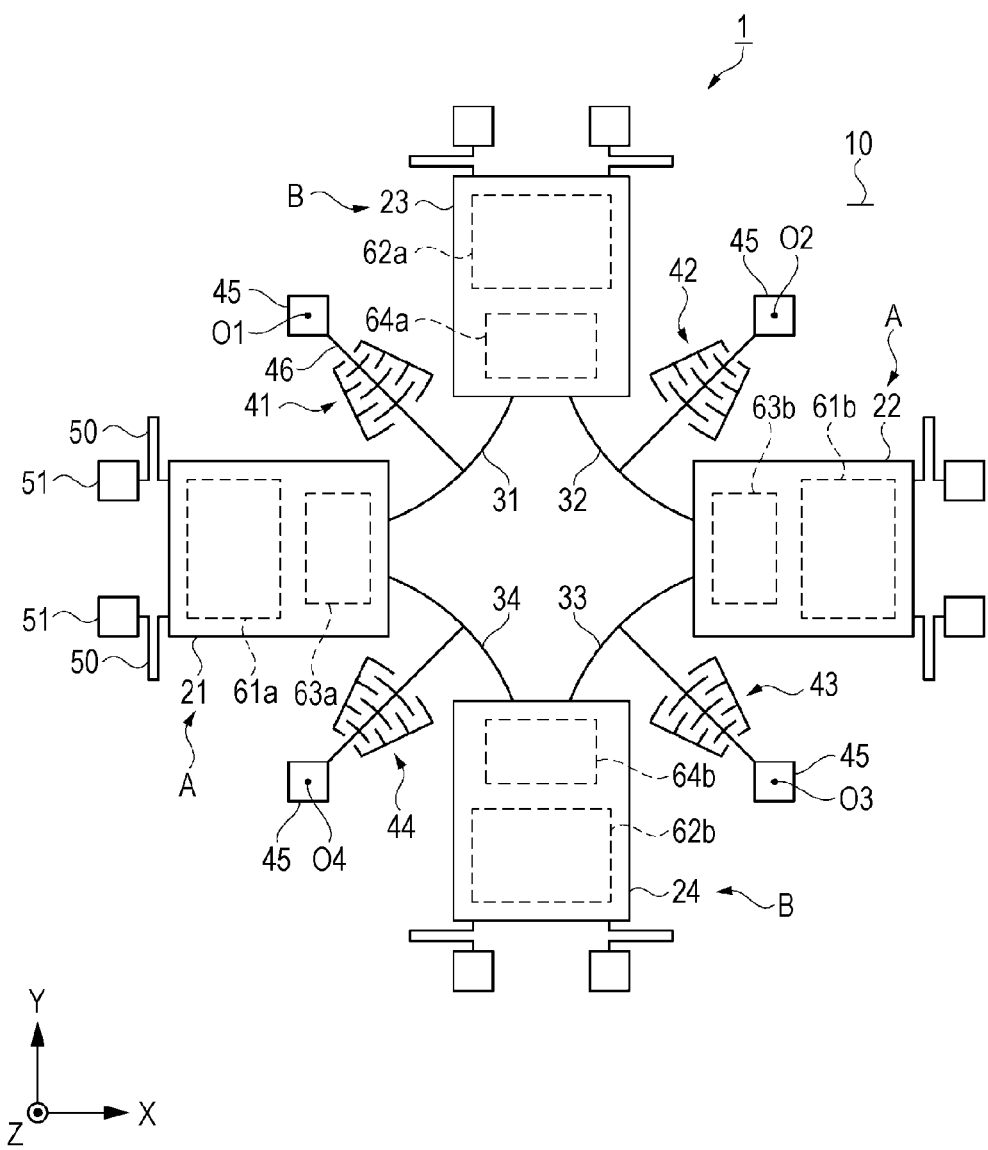
FIG. 1 is a schematic plan diagram illustrating a schematic configuration of an angular velocity sensor according to a first embodiment.
Figure 2:
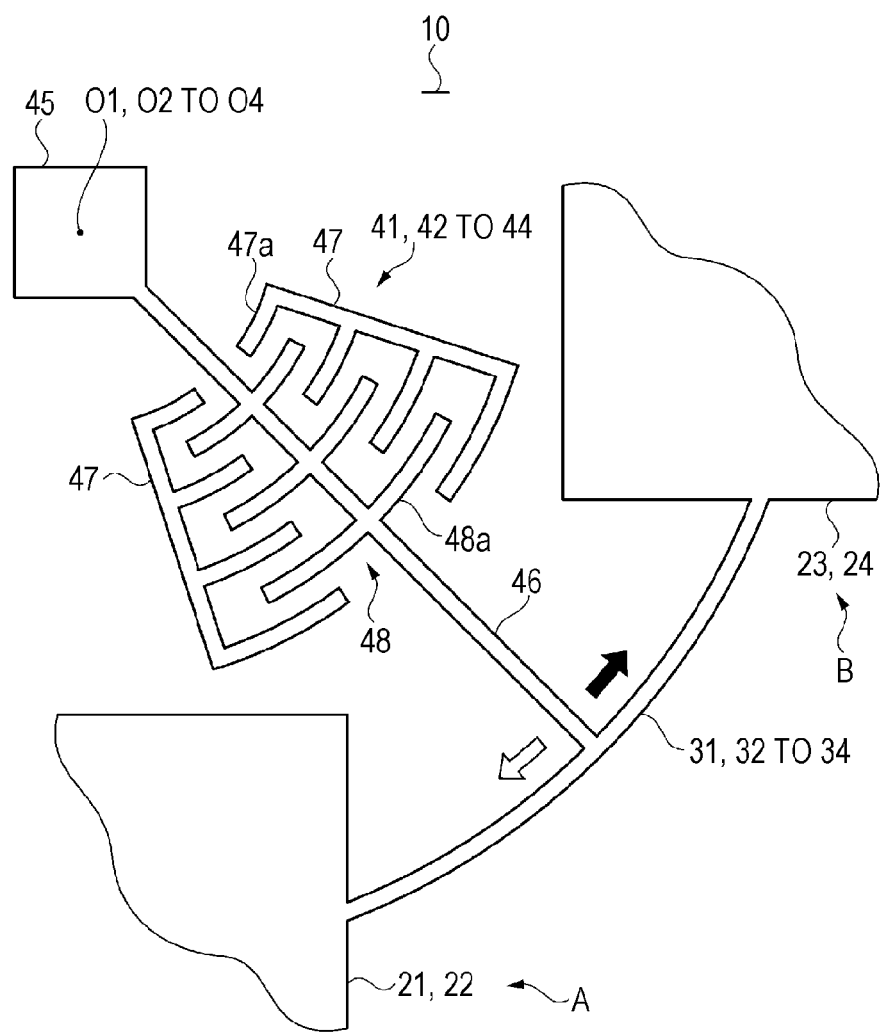
FIG. 2 is an enlarged schematic plan diagram of one essential unit of FIG. 1.
Figure 3A:
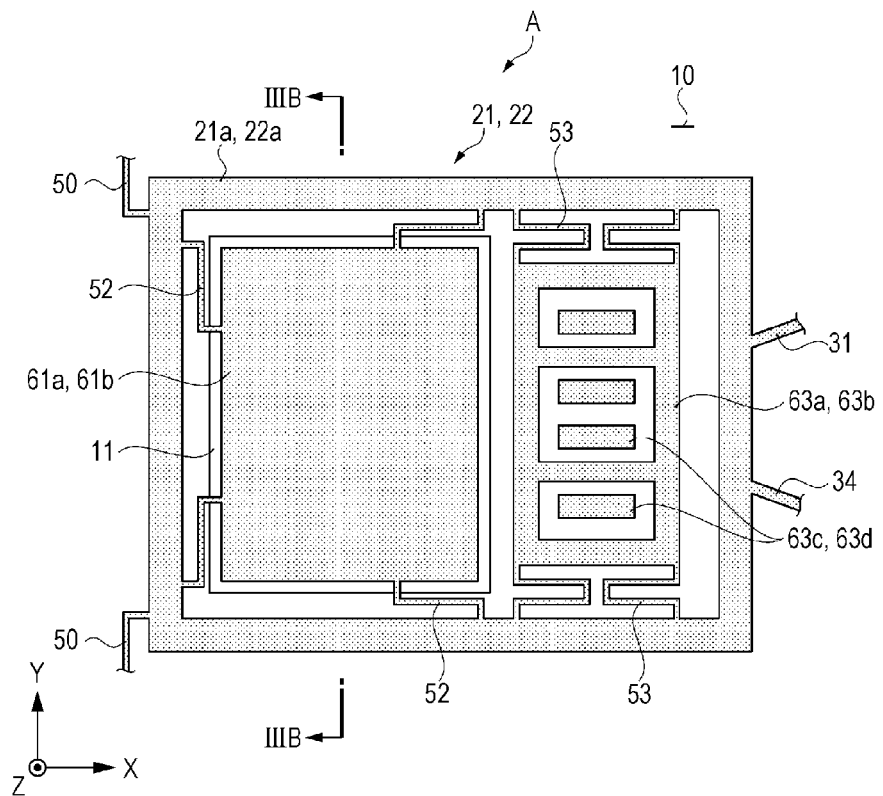
FIG. 3A is an enlarged schematic plan diagram of another essential unit of FIG. 1.
Figure 3B:
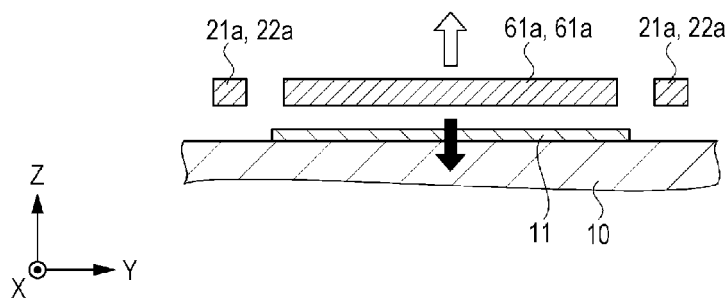
FIG. 3B is a schematic cross-sectional diagram cut along line IIIB-IIIB of FIG. 3A.
Figure 4A:
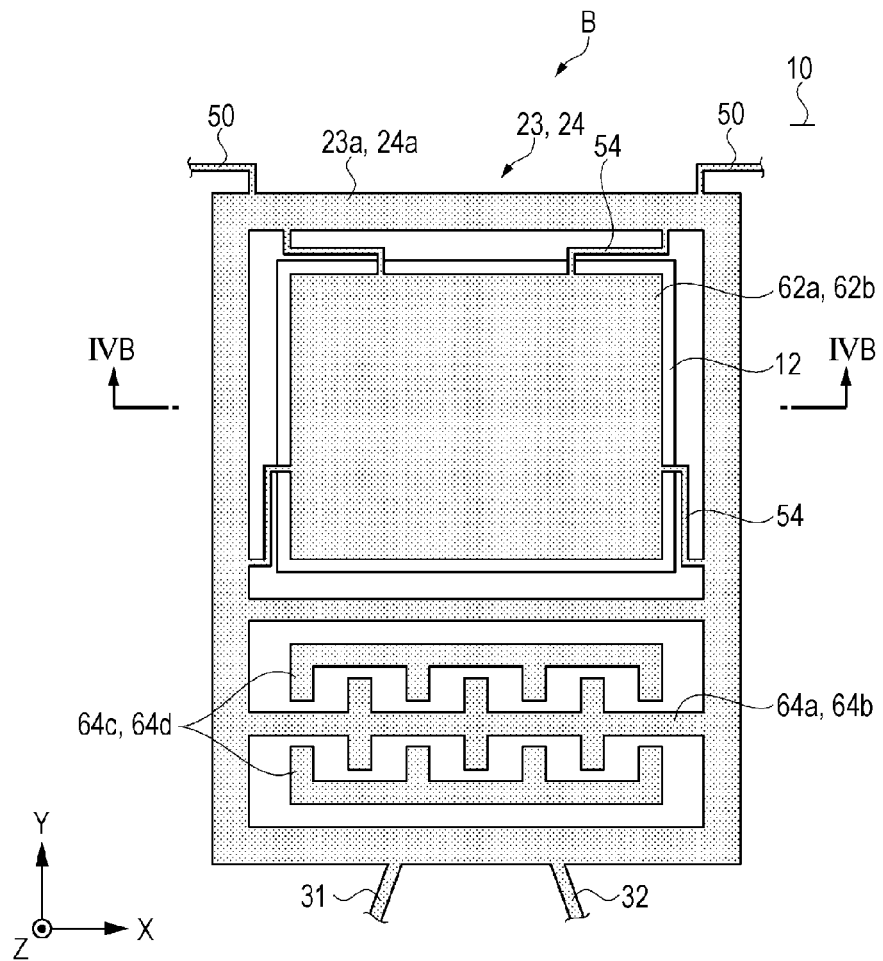
FIG. 4A is an enlarged schematic plan diagram of still another essential unit of FIG. 1.
Figure 4B:
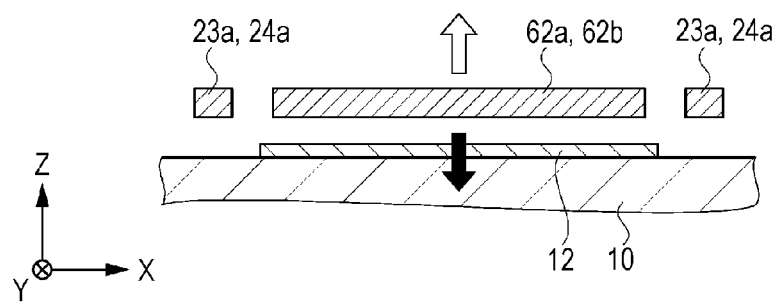
FIG. 4B is a schematic cross-sectional diagram cut along line IVB-IVB of FIG. 4A.

FIG. 1 is a schematic plan diagram illustrating a schematic configuration of an angular velocity sensor according to a first embodiment. FIGS. 2 to 4B are enlarged schematic diagrams of essential units of FIG. 1, FIG. 2 is an enlarged schematic plan diagram of one essential portion of FIG. 1, FIG. 3A is an enlarged schematic plan diagram of another essential portion of FIG. 1, and FIG. 3B is a schematic cross-sectional diagram cut along line IIIB-IIIB of FIG. 3A. In addition, FIG. 4A is an enlarged schematic plan diagram of still another essential portion of FIG. 1, and FIG. 4B is a schematic cross-sectional diagram cut along line IVB-IVB of FIG. 4A. In the figures, an X axis, a Y axis, and a Z axis are coordinate axes which are orthogonal to each other, and the direction of an arrow is a +(plus) direction.

As illustrated in FIG. 1, an angular velocity sensor 1 includes a substrate 10 of an approximately flat plate shape, a first mass unit 21, a second mass unit 22, a third mass unit 23, and a fourth mass unit 24 which are a plurality (here, four) of mass units that are disposed on the substrate 10, coupling units 31 to 34 which respectively couple the first mass unit 21 and the third mass unit 23, the third mass unit 23 and the second mass unit 22, the second mass unit 22 and the fourth mass unit 24, and the fourth mass unit 24 and the first mass unit 21 which are adjacent to each other, among the plurality of mass units, and drive units 41 to 44 which are disposed on the substrate 10 and are connected to the coupling units 31 to 34.

The plurality of mass units includes a first mass pair A in which the first mass unit 21 and the second mass unit 22 which are two mass units are disposed in a facing manner along the X axis which is defined as a first axis, and a second mass pair B in which the third mass unit 23 and the fourth mass unit 24, which are another two mass units, are disposed in a facing manner along the Y axis which is defined as a second axis which intersects (here, orthogonal) the X axis in a planar view.

The respective mass units 21 to 24 are formed in an approximately rectangular shape, and end portions opposite to end portions which are connected to the respective coupling units 31 to 34 are connected to the fixing units 51 which protrude from the substrate 10 through a spring unit 50.

The spring units 50 are provided as a pair in the end portions of the respective mass units 21 to 24. In the first mass pair A, the spring units protrude in the Y-axis direction and extend in the X-axis direction thereby being connected to the fixing units 51, and in the second mass pair B, the spring units protrude in the X-axis direction and extend in the Y-axis direction thereby being connected to the fixing units 51.

By doing this, the first mass pair A can be displaced in the X-axis direction by deflection (deformation) of the spring unit 50, and the second mass pair B can be displaced in the Y-axis direction in the same manner. A predetermined gap is provided between the respective mass units 21 to 24 and the substrate 10, in order to avoid interference at the time of displacement (for example, a concave portion which is not illustrated in the substrate 10 is provided).

The coupling units 31 to 34 are formed in arc shapes which respectively have centers O1 to O4, between the first mass unit 21 and the third mass unit 23, between the third mass unit 23 and the second mass unit 22, between the second mass unit 22 and the fourth mass unit 24, and between the fourth mass unit 24 and the first mass unit 21, which are mass units that are adjacent to each other.

The respective drive units 41 to 44 include a fixing unit 45 which includes the respective centers O1 to O4 of the arcs and are fixed to the substrate 10, and a moving unit 46 which connects the fixing unit 45 to the respective coupling units 31 to 34.

The respective drive units 41 to 44 are configured to be able to rotate the moving unit 46 and the respective coupling units 31 to 34 using the fixing unit 45 as the center thereof.

More specifically, as illustrated in FIG. 2, the respective drive units 41 to 44 include a pair of fixing electrodes 47 which are provided on the substrate 10 so as to interpose the moving unit 46 between the fixing electrodes 47, and a moving electrode 48 which is provided in the moving unit 46.

The fixing electrode 47 and the moving electrode 48 include comb-shaped electrode fingers 47a and 48a meshing with each other, and the electrode fingers 47a and 48a are respectively formed in an arc shape using the fixing unit 45 as the center thereof.

By doing this, the fixing electrode 47 and the moving electrode 48 are spread in a fan shape using the fixing unit 45 as the center thereof.

The respective drive units 41 to 44 apply a voltage between the fixing electrode 47 and the moving electrode 48 using, for example, a drive circuit which is not illustrated, and can alternately rotate the moving unit 46 and the respective coupling units 31 to 34 using electrostatic drive caused by electrostatic force (electrostatic attractive force, electrostatic repulsive force) between the fixing electrode 47 and the moving electrode 48, in a clockwise direction (white arrow direction) and a counter-clockwise direction (black arrow direction) using the fixing unit 45 as the center thereof.

Returning to FIG. 1, it is preferable that the first mass unit 21 and the second mass unit 22 are symmetrically shaped with respect to a straight line along the Y axis which passes between the first mass unit 21 and the second mass unit 22, and the third mass unit 23 and the fourth mass unit 24 are symmetrically shaped with respect to a straight line along the X axis which passes between the third mass unit 23 and the fourth mass unit 24.

The first mass unit 21 and the second mass unit 22 which are at least one (here, two) mass unit of the first mass pair A include first detection units 61a and 61b that detect Y-axis rotation angular velocity, and the third mass unit 23 and the fourth mass unit 24 which are at least one (here, two) mass unit of the second mass pair B include second detection units 62a and 62b that detect X-axis rotation angular velocity.

Furthermore, the first mass unit 21 and the second mass unit 22 which are at least one (here, two) mass unit of at least one (here, the first mass pair A) of the first mass pair A and the second mass pair B include third detection units 63a and 63b which detect angular velocity of Z-axis rotation defined as a third axis which intersects (here, orthogonal) a plane along the X axis and the Y axis.

Additionally, at least one (here, two units which are the third mass unit 23 and the fourth mass unit 24) of the mass units 21 to 24 includes monitoring units 64a and 64b which monitor displacement of the third mass unit 23 and the fourth mass unit 24 at the time of driving.

More specifically, as illustrated in FIGS. 3A and 3B, the first mass unit 21 and the second mass unit 22 of the first mass pair A include frame units 21a and 22a (parentheses in FIGS. 3A and 3B represent symbols of the second mass unit 22) of a rectangular frame shape, the first detection units 61a and 61b of a rectangular flat plate shape which are disposed inside the frame units 21a and 22a and detect the Y-axis rotation angular velocity, and the third detection units 63a and 63b of a rectangular lattice shape which are disposed inside the frame units 21a and 22a in parallel to the first detection units 61a and 61b in the X-axis direction and detect Z axis rotation angular velocity.

The first detection units 61a and 61b are connected to the frame units 21a and 22a through a plurality (here, four) of spring units 52.

The fixing electrode 11 which is larger than the first detection units 61a and 61b serving as moving electrodes by one rotation is provided on a surface, which is opposite to the first detection units 61a and 61b, on the substrate 10.

In such a manner that the first detection units 61a and 61b are hardly displaced in the X-axis direction and the Y-axis direction and can be easily displaced in the Z-axis direction, for example, two of the spring units 52 are respectively positioned in an end portion on a +Y side and in an end portion on a − (negative) Y side of the first detection units 61a and 61b, and are formed in a crank shape which extends in the Y-axis direction and is bent in the X-axis direction. The other two are positioned in an end portion which extends along the Y axis of the first detection units 61a and 61b, and are formed in a crank shape which extends in the X-axis direction and is bent in the Y-axis direction.

As illustrated in FIG. 3B, the first detection units 61a and 61b detect a change occurring between the fixing electrode 11 and the first detection units 61a and 61b, for example, a change of capacitance, according to displacement in the Z-axis direction of the first detection units 61a and 61b serving as moving electrodes, and therefore are able to detect the Y-axis rotation angular velocity.

The third detection units 63a and 63b are connected to the frame units 21a and 22a through a plurality (here, four) of spring units 53.

On the substrate 10, fixing electrodes 63c and 63d which extend along the X axis are provided so as to interpose beam-shaped portions of the third detection units 63a and 63b serving as moving electrodes.

In such a manner that the third detection units 63a and 63b are hardly displaced in the X-axis direction and can be easily displaced in the Y-axis direction, for example, the spring units 53 extend in the Y-axis direction while protruding in the X-axis direction, and connect an end portion on a +Y side and an end portion of −Y side of the third detection units 63a and 63b to the frame units 21a and 22a.

The third detection units 63a and 63b detect a change occurring between the fixing electrodes 63c and 63d and the third detection units 63a and 63b, for example, a change of capacitance, according to displacement in the Y-axis direction of the third detection units 63a and 63b serving as moving electrodes, and therefore are able to detect the Z-axis rotation angular velocity.

As illustrated in FIGS. 4A and 4B, the third mass unit 23 and the fourth mass unit 24 of the second mass pair B include frame units 23a and 24a (parentheses in FIGS. 4A and 4B represent symbols of the fourth mass unit 24) of a rectangular frame shape, the second detection units 62a and 62b of a rectangular flat plate shape which are disposed inside the frame units 23a and 24a and detect the X-axis rotation angular velocity, and monitoring units 64a and 64b which are disposed inside the frame units 23a and 24a in parallel with the second detection units 62a and 62b in the Y-axis direction and monitor displacement of the third mass unit 23 and the fourth mass unit 24 at the time of driving.

The second detection units 62a and 62b are connected to the frame units 23a and 24a through a plurality (here, four) of spring units 54.

The fixing electrode 12 which is larger than the second detection units 62a and 62b serving as moving electrodes by one rotation is provided on a surface, which is opposite to the second detection units 62a and 62b, on the substrate 10.

In such a manner that the second detection units 62a and 62b are hardly displaced in the X-axis direction and the Y-axis direction and can be easily displaced in the Z-axis direction, the spring units 54 are formed in a crank shape which is the same as the spring units 52, and connect an end portion extending along the X axis of the second detection units 62a and 62b, an end portion on a −X side, and an end portion on a +X side to the frame units 23a and 24a.

As illustrated in FIG. 4B, the second detection units 62a and 62b detect a change occurring between the fixing electrode 12 and the second detection units 62a and 62b, for example, a change of capacitance, according to displacement in the Z-axis direction of the second detection units 62a and 62b serving as moving electrodes, and therefore are able to detect the X-axis rotation angular velocity.

The monitoring units 64a and 64b extend in a beam shape along the X axis, are connected to the frame units 23a and 24a, and serve as moving electrodes.

The fixing electrodes 64c and 64d which extend along the X axis are provided on the substrate 10, so as to interpose the beam shape portion of the monitoring units 64a and 64b.

The monitoring units 64a and 64b and the fixing electrodes 64c and 64d are formed in a comb shape in such a manner that electrode fingers extending along the Y axis with a predetermined interval mesh with each other.

The monitoring units 64a and 64b can monitor by mechanically and electrically converting (replacing) displacement of the beam shape portion in the Y-axis direction into a change between the fixing electrodes 64c and 64d and the monitoring units 64a and 64b, for example, a change of capacitance.

It is preferable to use an insulating material, such as glass or high-resistivity silicon, as a configuration material of the substrate 10. Particularly, in a case in which an element plate that overlaps the substrate 10 and is attached to the respective mass units 21 to 24, the respective coupling units 31 to 34, the respective drive units 41 to 44, the spring unit 50, the fixing unit 51, or the like using etching or the like, is a semiconductor element plate that is configured to use a semiconductor material such as silicon as a main material, it is preferable to use glass (borosilicate glass, for example, Pyrex (registered trademark)) containing alkali metal ions (moving ion) as a configuration material of the substrate 10.

By doing this, the angular velocity sensor 1 can anodically bond the substrate 10 to the semiconductor element plate. In addition, the angular velocity sensor 1 uses glass containing alkali metal ions for the substrate 10, and therefore the substrate 10 and the semiconductor element plate can be easily separated in an insulating manner.

The substrate 10 may not have insulation properties, and for example, may be a conductive substrate which is configured of a low-resistivity silicon. In this case, an insulating film is interposed between the substrate 10 and the semiconductor element plate, and thereby both are separated in an insulating manner.

It is preferable that thermal expansion coefficient difference between the configuration material of the substrate 10 and the configuration material of the semiconductor element plate is as small as possible. Specifically, it is preferable that the thermal expansion coefficient difference between the configuration material of the substrate 10 and the configuration material of the semiconductor element plate is equal to or less than 3 ppm/° C. By doing this, the angular velocity sensor 1 can reduce residual stress between the substrate 10 and the semiconductor element plate.

Hereafter, an operation of the angular velocity sensor 1 will be described.

Figure 5:
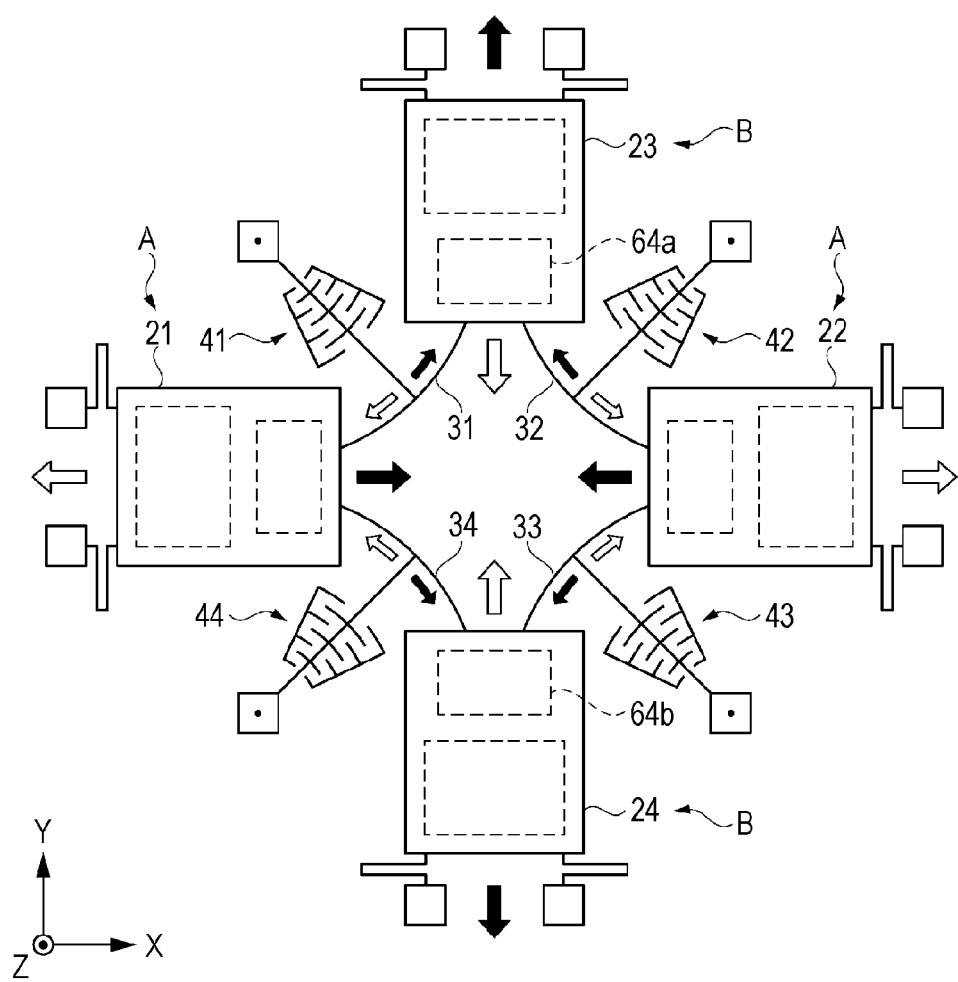
FIG. 5 is a schematic plan diagram illustrating a drive vibration state of an angular velocity sensor.
Figure 6A:
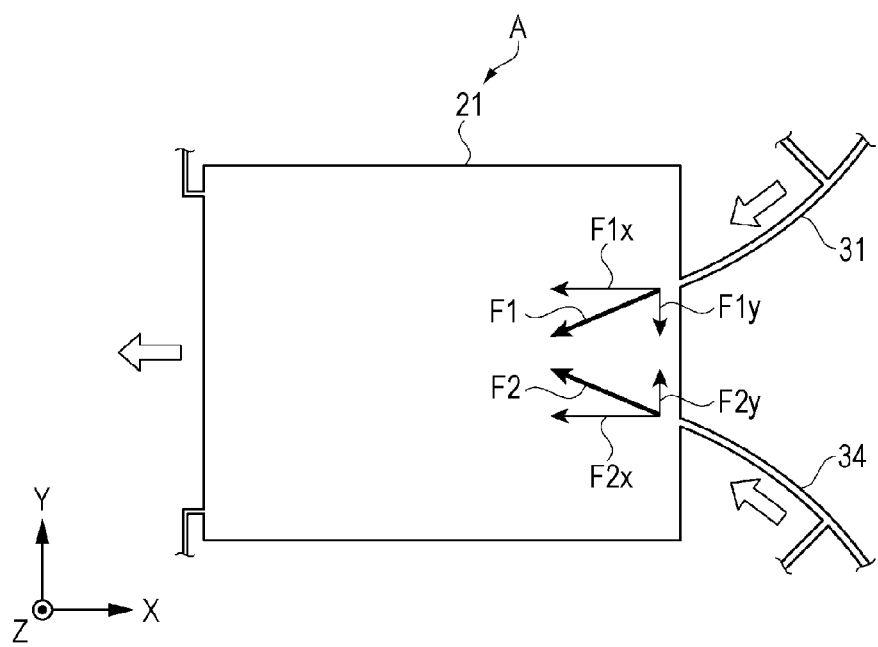
FIGS. 6A and 6B are schematic diagrams illustrating a method of adding force to an angular velocity sensor in a drive vibration state.
Figure 6B:
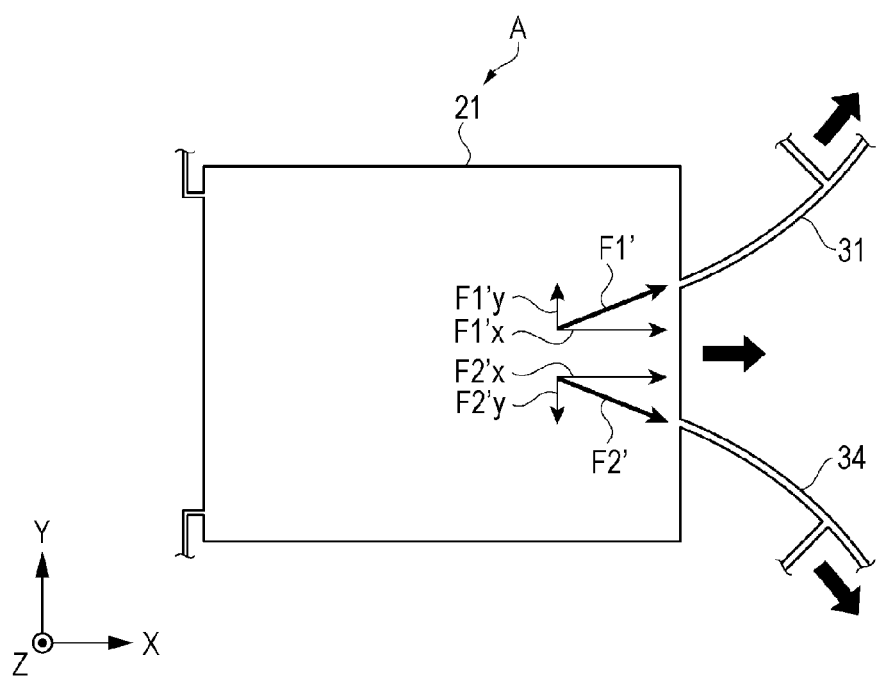
Figure 7:
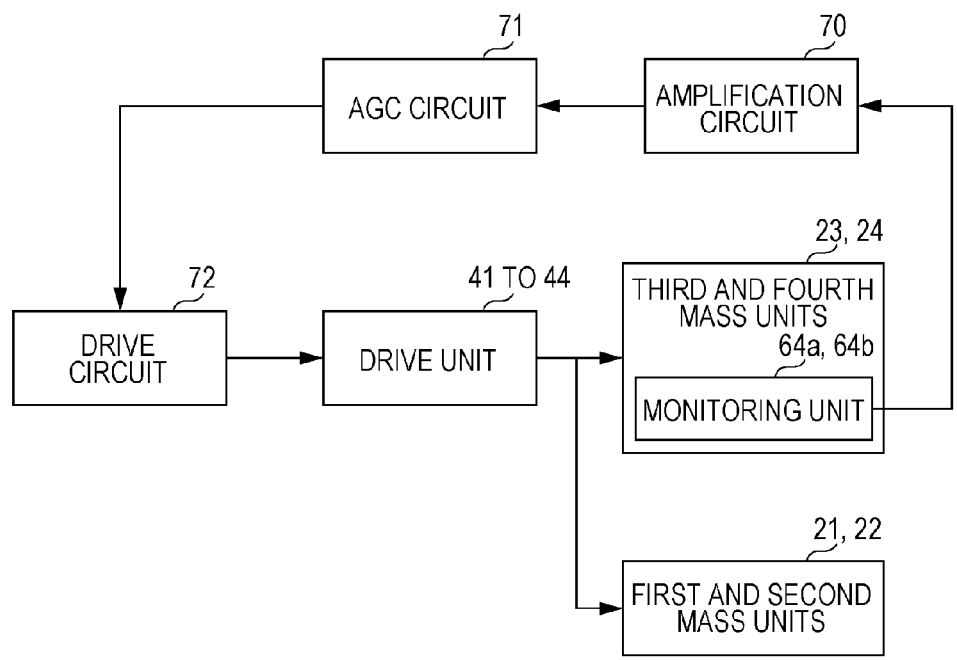
FIG. 7 is a block diagram illustrating a function of a monitoring unit which monitors a drive vibration state of an angular velocity sensor.

FIG. 5 is a schematic plan diagram illustrating a drive vibration state of the angular velocity sensor, FIG. 6A and FIG. 6B are schematic diagrams illustrating a force-adding method of the drive vibration state of the angular velocity sensor, and FIG. 7 is a block diagram illustrating a function of the monitoring unit which monitors the drive vibration state of the angular velocity sensor.

Figure 8:
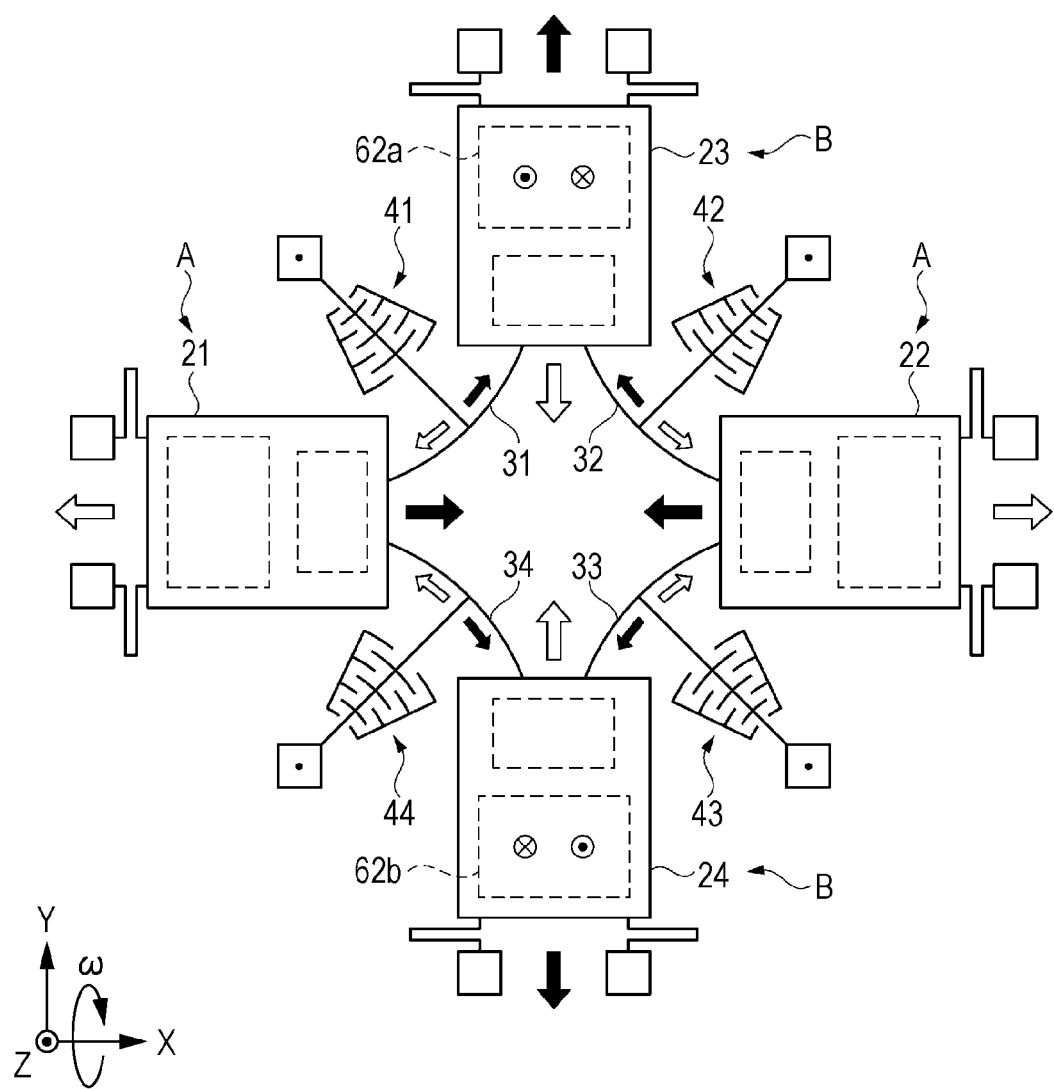
FIG. 8 is a schematic plan diagram illustrating a detection vibration state of detecting an X-axis rotation angular velocity of an angular velocity sensor.
Figure 9:
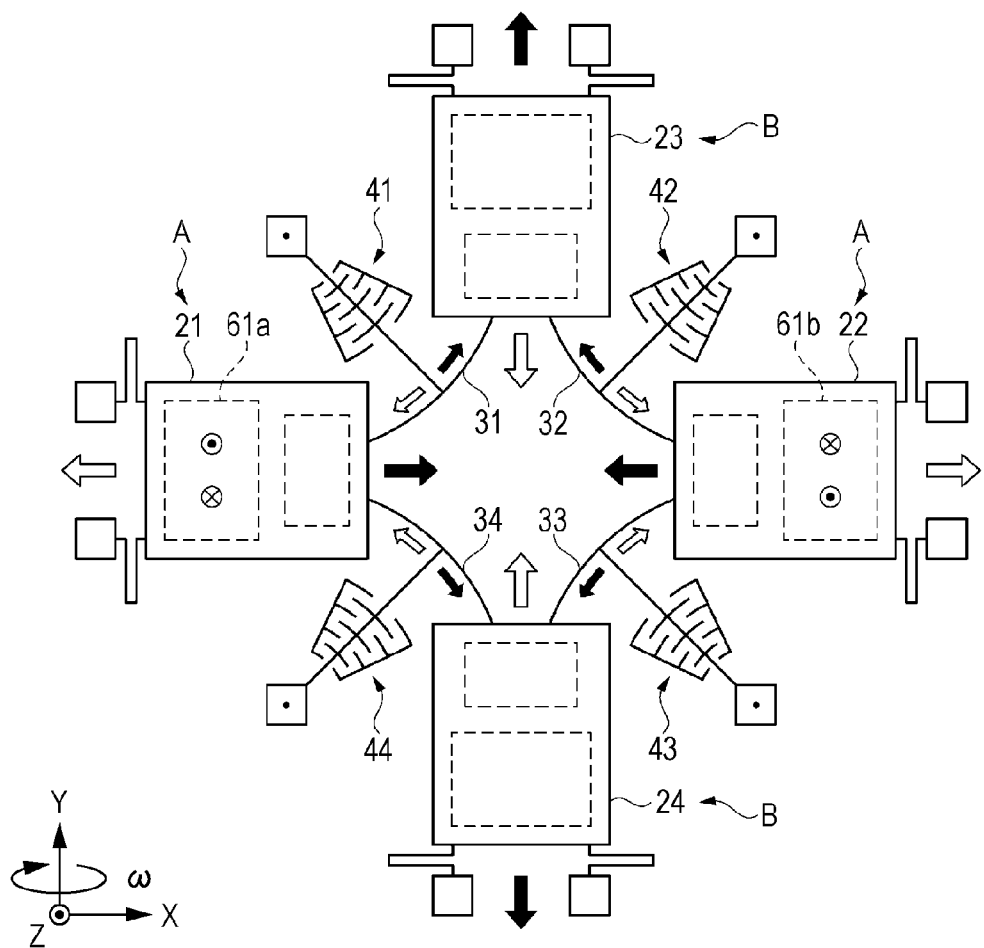
FIG. 9 is a schematic plan diagram illustrating a detection vibration state of detecting a Y-axis rotation angular velocity of an angular velocity sensor.
Figure 10:
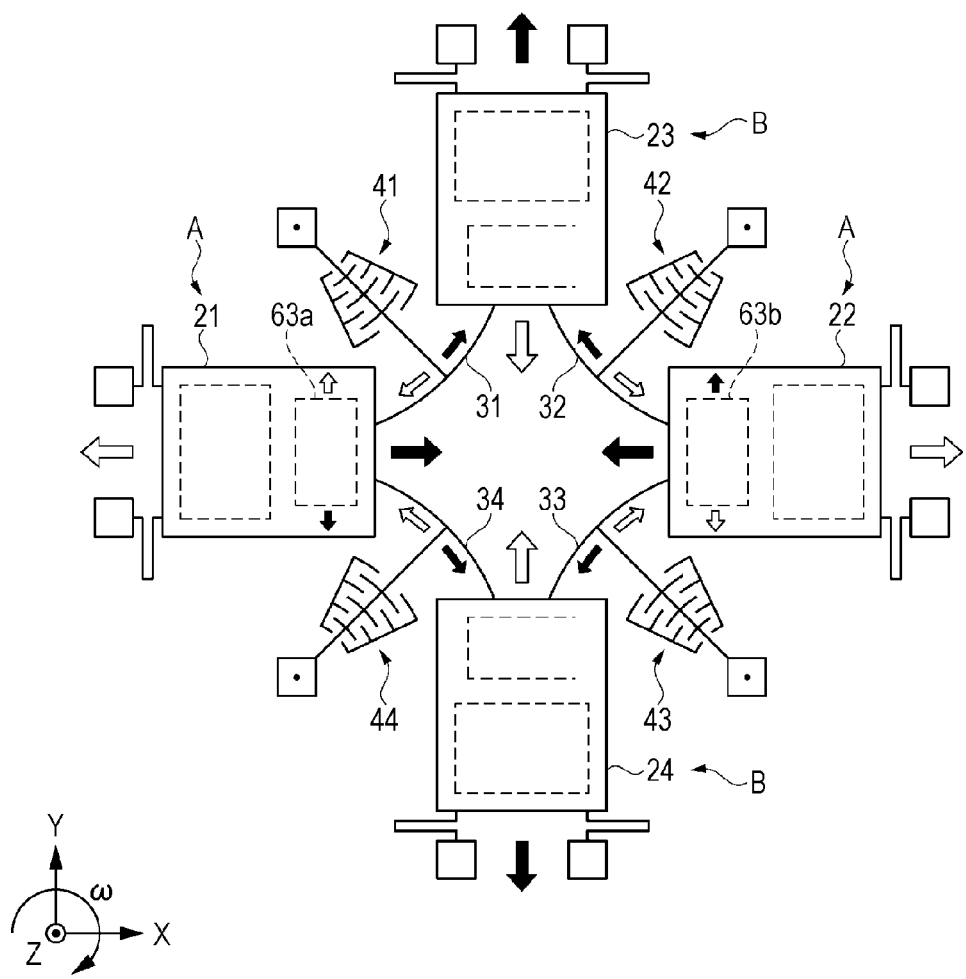
FIG. 10 is a schematic plan diagram illustrating a detection vibration state of detecting a Z-axis rotation angular velocity of an angular velocity sensor.

In addition, FIG. 8 is a schematic plan diagram illustrating a detection vibration state of detecting the X-axis rotation angular velocity of the angular velocity sensor, FIG. 9 is a schematic plan diagram illustrating a detection vibration state of detecting the Y-axis rotation angular velocity of the angular velocity sensor, and FIG. 10 is a schematic plan diagram illustrating a detection vibration state of detecting the Z-axis rotation angular velocity of the angular velocity sensor.

As illustrated in FIG. 5, in the angular velocity sensor 1, for example, if the drive signals are applied to the respective drive units 41 to 44 from a drive circuit which is not illustrated, the respective drive units 41 to 44 alternately rotate the respective coupling units 31 to 34 in a black arrow direction and a white arrow direction, such that the second mass pair B (the third mass unit 23 and the fourth mass unit 24) is displaced in a direction that separates the pair from each other (black arrow), when the first mass pair A (the first mass unit 21 and the second mass unit 22) is displaced in a direction that brings the pair toward each other, and such that the second mass pair B is displaced in a direction that brings the pair toward each other (white arrow), when the first mass pair A is displaced in a direction that separates the pair from each other. Thereby, the respective mass units 21 to 24 are driven (drive vibration is performed).

Here, a method of adding force from the respective coupling units 31 to 34 to the respective mass units 21 to 24 will be described. Here, an example in which the first mass unit 21 is representatively used will be described, but the other mass units 22 to 24 may be respectively used in the same manner as the first mass unit 21.

As illustrated in FIG. 6A, if the coupling units 31 and 34 rotate in the white arrow direction, forces F1 and F2 are applied to the first mass unit 21 in an oblique −X direction along tangent lines of end portions of the coupling units 31 and 34.

At this time, a component force F1y which is a component force along the Y axis of the force F1, and a component force F2y which is a component force along the Y axis of the force F2 are equal in magnitude and are opposite directionally, thereby cancelling one another.

Meanwhile, a component force F1x which is a component force along the X axis of the force F1, and a component force F2x which is a component force along the X axis of the force F2 are equal in magnitude and are applied in the same direction, and therefore are added to each other along the X axis. The first mass unit 21 is displaced in the white arrow direction along the X axis.

As illustrated in FIG. 6B, if the coupling units 31 and 34 rotate in the black arrow direction, forces F1' and F2' are applied to the first mass unit 21 in a direction opposite to the forces F1 and F2 along tangent lines of end portions of the coupling units 31 and 34.

At this time, a component force F1'y which is a component force along the Y axis of the force F1', and a component force F2'y which is a component force along the Y axis of the force F2' are equal in magnitude and are opposite in direction, and therefore cancel one another.

Meanwhile, a component force F1'x which is a component force along the X axis of the force F1', and a component force F2'x which is a component force along the X axis of the force F2' are equal in magnitude and are also applied in the same direction, and therefore are added to each other along the X axis. The first mass unit 21 is displaced in the black arrow direction along the X axis.

By doing this, as illustrated in FIG. 5, the respective mass units 21 to 24 are subjected to alternate and repetitive drive vibration of the displacement in the white arrow direction and the displacement in the black arrow direction.

At this time, the monitoring units 64a and 64b which are illustrated in detail in FIG. 4A monitor displacement in the Y-axis direction of the third mass unit 23 and the fourth mass unit 24 as a change of capacitance between the fixing electrodes 64c and 64d and the monitoring units 64a and 64b.

As illustrated in FIG. 7, the angular velocity sensor 1 amplifies the change of capacitance which is monitored by the monitoring units 64a and 64b, in an amplification circuit 70 which uses, for example, an operational amplifier or the like, and the change of capacitance is controlled by an automatic gain control (AGC) circuit 71 or the like at a predetermined level, and is applied (feedback) to a drive circuit 72.

Drive forces of the respective drive units 41 to 44 are increased by this loop, and the angular velocity sensor is configured to be able to maintain an amount of displacement at the time of driving the respective mass units 21 to 24 at a predetermined level.

As illustrated in FIG. 8, in the above-described drive vibration state, if an angular velocity ω is applied to an X-axis rotation, the second detection units 62a and 62b, which are illustrated in detail in FIGS. 4A and 4B, of the third mass unit 23 and the fourth mass unit 24 perform detection vibrations of alternately repeating the displacement (displacement in the white arrow direction of FIG. 4B) in a +Z direction and the displacement (displacement in the black arrow direction of FIG. 4B) in a −Z direction. "•" in "○" in FIG. 8 represents the displacement in the +Z direction, and "x" in "○" in FIG. 8 represents the displacement in the −Z direction.

In detail, the detection vibration is performed in which, if the second detection unit 62a is displaced in the +Z direction, the second detection unit 62b is displaced in the −Z direction, and if the second detection unit 62a is displaced in the −Z direction, the second detection unit 62b is displaced in the +Z direction.

The angular velocity sensor 1 can draw the X-axis rotation angular velocity by taking out a differential change amount of capacitance depending on the above-described displacement of the second detection units 62a and 62b as a detection signal.

As illustrated in FIG. 9, in the above-described drive vibration state, if an angular velocity ω is applied to an Y-axis rotation, the first detection units 61a and 61b, which are illustrated in detail in FIGS. 3A and 3B, of the first mass unit 21 and the second mass unit 22 perform detection vibrations of alternately repeating the displacement (displacement in the white arrow direction of FIG. 3B) in a +Z direction and the displacement (displacement in the black arrow direction of FIG. 3B) in a −Z direction. "•" in "○" in FIG. 9 represents the displacement in the +Z direction, and "x" in "○" in FIG. 9 represents the displacement in the −Z direction.

In detail, the detection vibration is performed in which, if the first detection unit 61a is displaced in the +Z direction, the first detection unit 61b is displaced in the −Z direction, and if the first detection unit 61a is displaced in the −Z direction, the first detection unit 61b is displaced in the +Z direction.

The angular velocity sensor 1 can draw the Y-axis rotation angular velocity by taking out a differential change amount of capacitance depending on the above-described displacement of the first detection units 61a and 61b as a detection signal.

The As illustrated in FIG. 10, in the above-described drive vibration state, if an angular velocity ω is applied to an Z-axis rotation, the third detection units 63a and 63b, which are illustrated in detail in FIG. 3A, of the first mass unit 21 and the second mass unit 22 perform detection vibrations of alternately repeating displacement in the +Y direction and displacement in the −Y direction along the Y axis.

In detail, the detection vibration is performed in which, if the third detection unit 63a is displaced in the +Y direction, the third detection unit 63b is displaced in the −Y direction (white arrow), and if the third detection unit 63a is displaced in the −Y direction, the third detection unit 63b is displaced in the +Y direction (black arrow).

The angular velocity sensor 1 can draw the Z-axis rotation angular velocity by taking out a change of capacitance depending on the above-described displacement of the third detection units 63a and 63b as a detection signal.

As described above, the angular velocity sensor 1 according to the first embodiment includes the coupling unit (31 or the like) which couples the mass units (the first mass unit 21, the third mass unit 23, and the like) that are adjacent to each other, and the respective drive units 41 to 44 which are connected to the respective coupling units 31 to 34. The respective drive units 41 to 44 respectively drive the mass units (the first mass unit 21, the third mass unit 23, and the like) that are adjacent to each other through the respective coupling units 31 to 34.

In contrast to this, the angular velocity sensor which is disclosed in European Patent Application Publication No. 2339293 which is an example of related art transfers the drive vibration from the first mass pair to the second mass pair through the coupling unit, and thus when the drive vibration of the four mass units is performed, an unnecessary vibration mode different from an original vibration mode is easily generated, and thus, it is necessary to perform frequency control for limiting the unnecessary vibration mode.

The angular velocity sensor 1 according to the embodiment can drive in substantially the same manner as each other the mass units (the first mass unit 21, the third mass unit 23, and the like) that are adjacent to each other, and thus it is possible to make the amounts of displacement (amplitude at the time of drive vibration) of the respective mass units 21 to 24 at the time of driving approximately equal to each other.

As a result, the angular velocity sensor 1 can make the amounts of displacement (amplitude of detection vibration) of the respective mass units 21 to 24, for example, at the time of detecting angular velocity approximately equal to each other, and thus it is possible to decrease a difference of a detection sensitivity between the respective detection axes (X axis, Y axis, and Z axis) of the angular velocity ω.

By doing this, the angular velocity sensor 1 can improve detection characteristics of the angular velocity ω.

In addition, for the angular velocity sensor 1, the respective drive units 41 to 44 are subjected to drive vibration of the respective mass units 21 to 24 (herein, the drive vibration form (vibration mode) is referred to as an alternative mode), such that the second mass pair B is displaced in a direction that separates the pair from each other, when the first mass pair A is displaced in a direction that brings the pair toward each other, and such that the second mass pair B is displaced in a direction that brings the pair toward each other, when the first mass pair A is displaced in a direction that separates the pair from each other.

As a result, in the angular velocity sensor 1, a vibration mode of the drive vibration of the respective mass units 21 to 24 is defined as an alternative mode by the respective drive units 41 to 44, and thus it is possible to suppress generation of an unnecessary vibration mode other than the alternative mode at the time of driving.

By doing this, the angular velocity sensor 1 can suppress a malfunction caused by the unnecessary vibration mode, or can simplify means for suppressing the unnecessary vibration mode.

In addition, the angular velocity sensor 1 can reduce a difference of detection sensitivity between the respective detection axes (X axis, Y axis, and Z axis) using the first detection units 61a and 61b, the second detection units 62a and 62b, and the third detection units 63a and 63b which are provided in the respective mass units 21 to 24, and can detect each angular velocity ω of the three detection axis rotations.

In addition, for the angular velocity sensor 1, at least one (herein, two units of the third mass unit 23 and the fourth mass unit 24) of the respective mass units 21 to 24 includes the monitoring units 64*a* and 64*b* which monitor the displacement of the third mass unit 23 and the fourth mass unit 24 at the time of driving.

Because of this, the angular velocity sensor 1 can maintain an amount of displacement at the time of driving the respective mass units 21 to 24 at a predetermined level, by electromechanically converting (herein, converting into capacitance) the displacement, amplifying the displacement using the amplification circuit 70, controlling the displacement to a predetermined level using the AGC circuit or the like, and applying the displacement to the respective drive units 41 to 44 through the drive circuit 72.

As a result, the drive states of the respective mass units 21 to 24 are stable, and thus the angular velocity sensor 1 can improve the detection characteristics of the angular velocity ω.

In addition, in the angular velocity sensor 1, the respective coupling units 31 to 34 are formed in an arc shape, the respective drive units 41 to 44 includes the fixing unit 45 which and is fixed to the substrate 10 and the moving unit 46 which couples the fixing unit 45 to the respective coupling units 31 to 34. The moving unit 46 and the respective coupling units 31 to 34 can rotate using the fixing unit 45 as the center thereof.

As a result, in the angular velocity sensor 1, the respective drive units 41 to 44 can smoothly drive the respective mass units 21 to 24 through the respective coupling units 31 to 34.

In addition, the fixing electrodes 47 and the moving electrodes 48 of the respective drive units 41 to 44 include electrode fingers 47*a* and 48*a* of a comb shape meshing with each other, the electrode fingers 47*a* and 48*a* are formed in an arc shape using the fixing unit 45 as the center thereof, and thus the angular velocity sensor 1 can smoothly rotate the moving unit 46 and the respective coupling units 31 to 34 using the fixing unit 45 as the center thereof.

Modification Example

Next, an angular velocity sensor of a modification example according to the first embodiment will be described.

Figure 11:
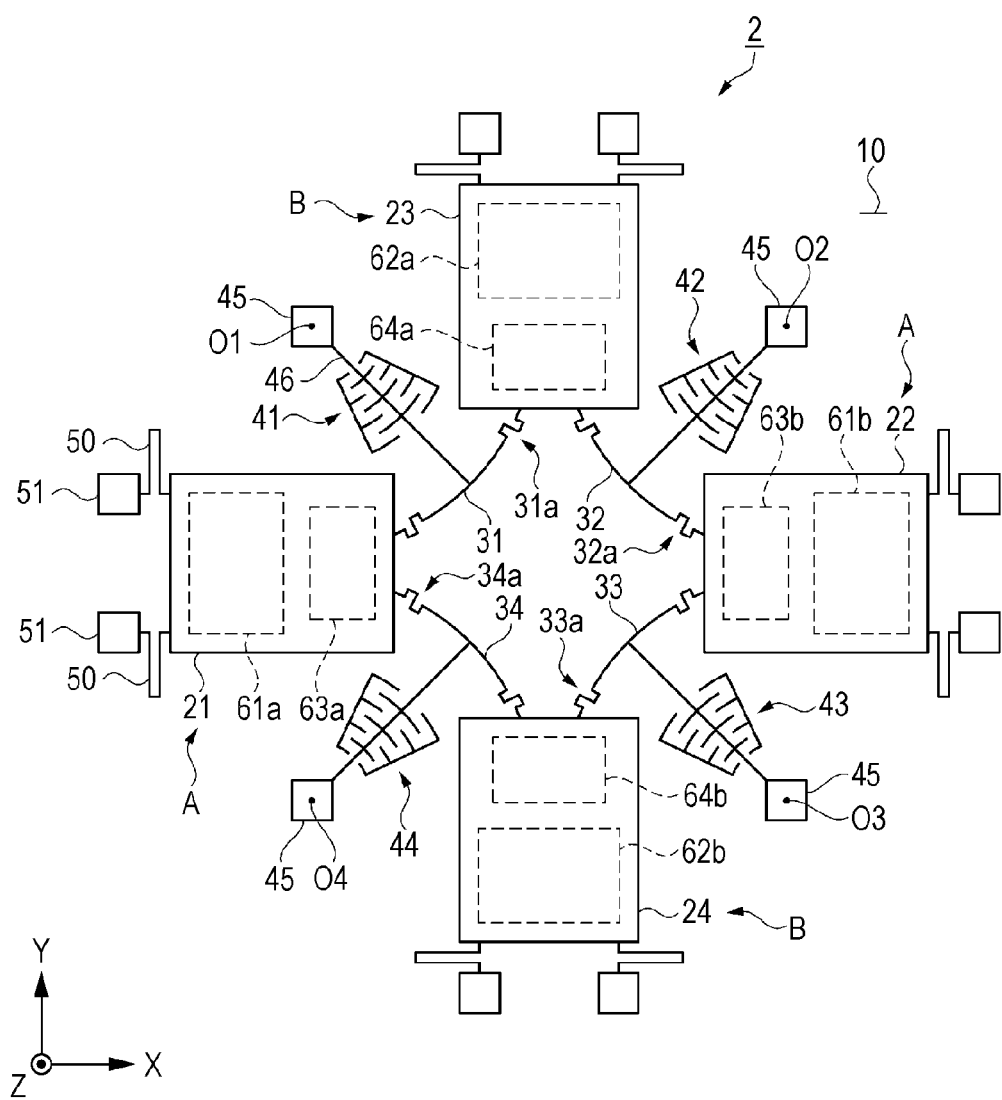
FIG. 11 is a schematic plan diagram illustrating a schematic configuration of an angular velocity sensor of a modification example according to the first embodiment.

FIG. 11 is a schematic plan diagram illustrating a schematic configuration of an angular velocity sensor of a modification example according to the first embodiment. The same symbols or reference numerals will be attached to the same configurations as in the first embodiment, detailed description thereof will be omitted, and configurations different from those of the first embodiment will be mainly described.

As illustrated in FIG. 11, an angular velocity sensor 2 of the modification example includes the respective coupling units 31 to 34 having different configurations from those of the first embodiment.

The angular velocity sensor 2 includes stress reduction units 31*a* to 34*a* in the connection units between the respective coupling units 31 to 34 and the respective mass units 21 to 24.

The respective stress reduction units 31*a* to 34*a* meander in directions intersecting extending directions of the respective coupling units 31 to 34, or are formed in a protruding and meandering shape.

By doing this, stress occurring in the connection units between the respective coupling units 31 to 34 and the respective mass units 21 to 24 at the time of driving are dispersed into the respective stress reduction units 31*a* to 34*a*, and thus the angular velocity sensor 2 can reduce concentration of the stress.

As a result, durability of the respective coupling units 31 to 34 is improved, and thus the angular velocity sensor 2 can increase reliability.

This configuration can also be applied to the following embodiments.

Second Embodiment

Figure 12:
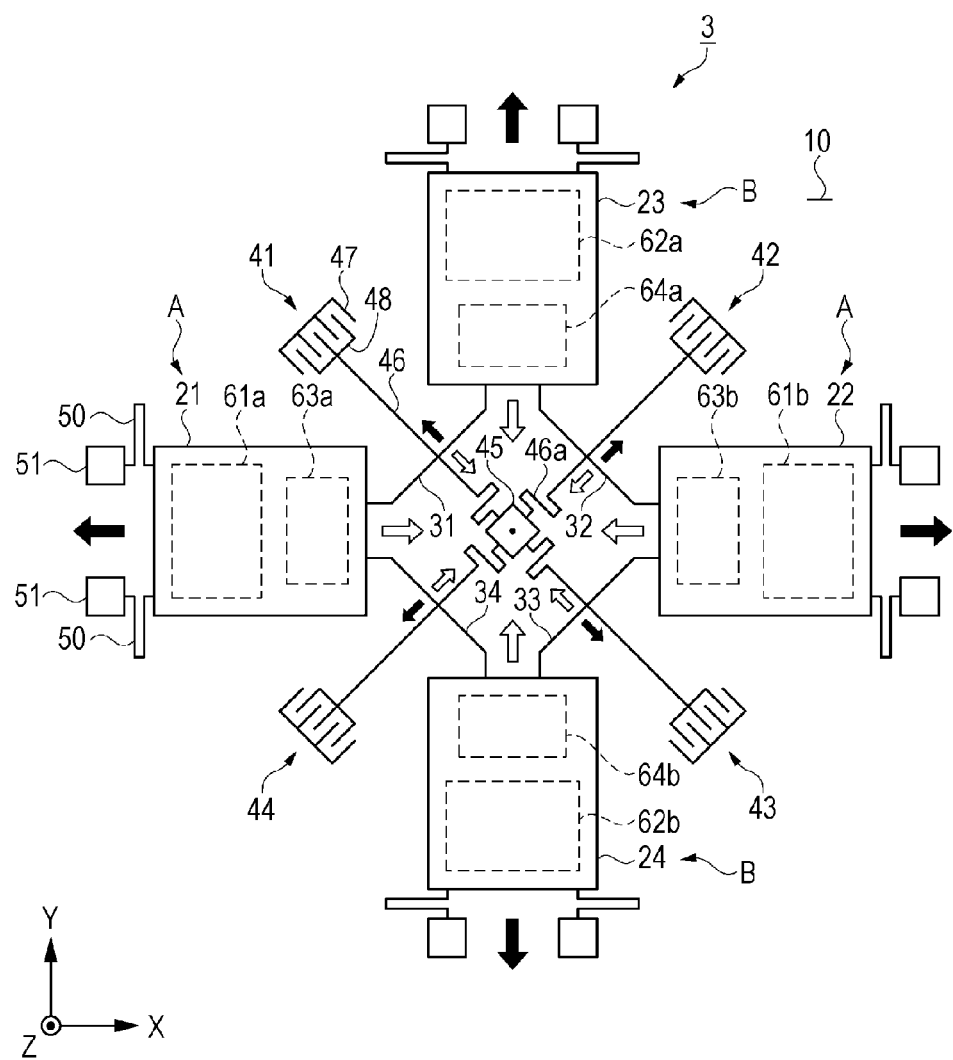
FIG. 12 is a schematic plan diagram illustrating a schematic configuration of an angular velocity sensor according to a second embodiment.

FIG. 12 is a schematic plan diagram illustrating a schematic configuration of an angular velocity sensor according to a second embodiment. The same symbols or reference numerals will be attached to the same configurations as in the first embodiment, detailed description thereof will be omitted, and configurations different from those of the first embodiment will be mainly described.

As illustrated in FIG. 12, an angular velocity sensor 3 according to the second embodiment has different drive directions of the respective drive units 41 to 44 from those of the first embodiment.

In the angular velocity sensor 3, the fixing unit is provided in an intersecting portion at which a line connecting the first mass pair A to each other intersects a line connecting the second mass pair B, and the moving unit is connected to the respective coupling units 31 to 34 from the fixing unit 45 through a displacement absorption unit 46*a* which is formed in a meandering shape.

Furthermore, the moving unit 46 extends to areas of the fixing electrode 47 and the moving electrode 48 of the respective drive units 41 to 44 from the respective coupling units 31 to 34. The moving unit 46 extends in a straight line shape at an angle of approximately 45 degrees with respect to the X axis or the Y axis.

The displacement absorption unit 46*a* does not interfere with a linear reciprocating motion, which will be described later, of the moving unit 46 for the meandering shape, and is connected to the fixing unit 45, thereby supporting the moving unit 46.

The respective coupling units 31 to 34 extend toward the fixing unit 45 side along an extending direction of the respective mass units 21 to 24, and are bent in directions orthogonal to the moving unit 46 from the middle, and thereby the mass units (the first mass unit 21 and the third mass unit 23) that are adjacent to each other are coupled together.

The shapes of the respective coupling units 31 to 34 are not limited to the above-described shape, and may be the same shapes as those of the first embodiment.

The respective drive units 41 to 44 are provided in a shape in which the fixing electrode 47 and the moving electrode 48 are meshed in parallel in a direction in which comb teeth are orthogonal to an extending direction of the moving unit 46, for example, as illustrated, such that the moving unit 46 performs a straight reciprocating motion (alternate displacement in a white arrow direction and a black arrow direction) along an extending direction.

By doing this, in a drive vibration state, the angular velocity sensor 3 can perform drive vibration of alternately repeating displacement in the white arrow direction and displacement in the black arrow direction, such that the second mass pair B (the third mass unit 23 and the fourth mass unit 24) is displaced (white arrow) in a direction that brings the pair toward each other, when the first mass pair A (the first mass unit 21 and the second mass unit 22) is displaced (white arrow) in a direction that brings the pair toward each other, and such that the second mass pair B is displaced (black arrow) in a direction that separates the pair from each other, when the first mass pair A is displaced (black arrow) in a direction that separates the pair from each other.

Herein, the vibration mode is referred to as an expansion mode.

As described above, for the angular velocity sensor 3, a vibration mode of a drive vibration is an expansion mode different from the alternative mode according to the first embodiment, but is the same as in the first embodiment in the detection vibration, and thus, description with regard to an operation at the time of applying angular velocity will be omitted.

The angular velocity sensor 3 is configured as described above, and thus, drive levels of the respective mass units 21 to 24 through the respective coupling units 31 to 34 by the respective drive units 41 to 44, and detection levels of the respective detection units 61a, 61b, 62a, 62b, 63a, and 63b at the time of applying angular velocity can be configured in the same manner as in the first embodiment.

In addition, a vibration mode is defined by an expansion mode, and thus the angular velocity sensor 3 can suppress the occurrence of an unnecessary vibration mode other than the expansion mode at the time of driving.

As a result, the angular velocity sensor 3 can obtain the same effect as that of the first embodiment.

Electronic Apparatus

Next, an electronic apparatus including the above-described angular velocity sensor will be described.

Figure 13:
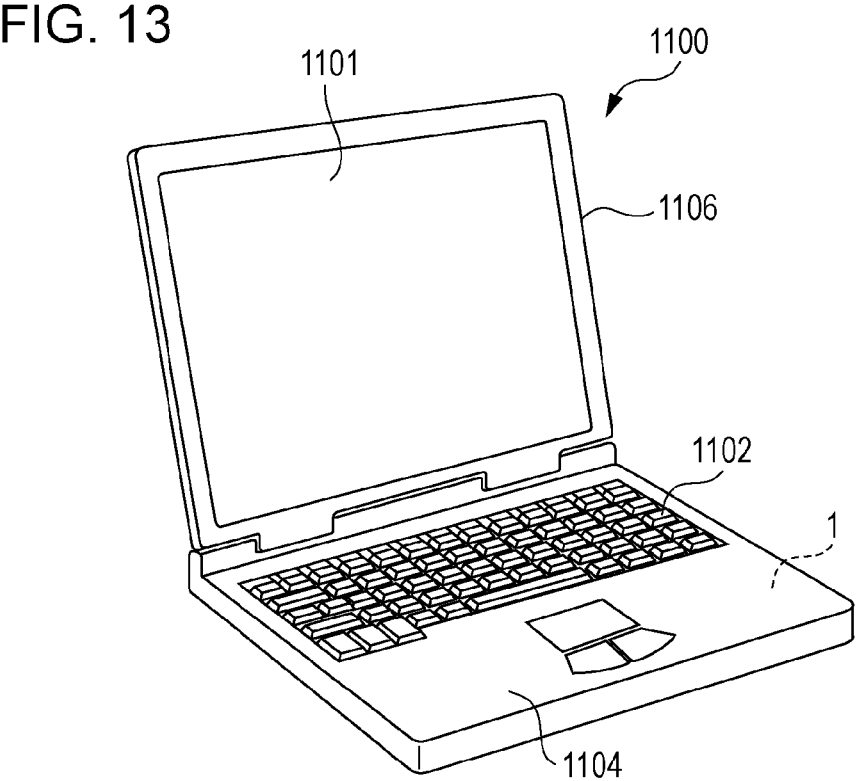
FIG. 13 is a schematic perspective diagram illustrating a configuration of a personal computer of a mobile type (or notebook type) which functions as an electronic apparatus including an angular velocity sensor.

FIG. 13 is a schematic perspective diagram illustrating a configuration of a personal computer of a mobile type (or notebook type) which functions as an electronic apparatus including an angular velocity sensor.

As illustrated in FIG. 13, a personal computer 1100 is configured of a body unit 1104 including a key board 1102, and a display unit 1106 including a display unit 1101. The display unit 1106 is supported so as to be able to rotate via a hinge structure with respect to the body unit 1104.

The angular velocity sensor 1 (or either 2 or 3) is embedded in the personal computer 1100.

Figure 14:
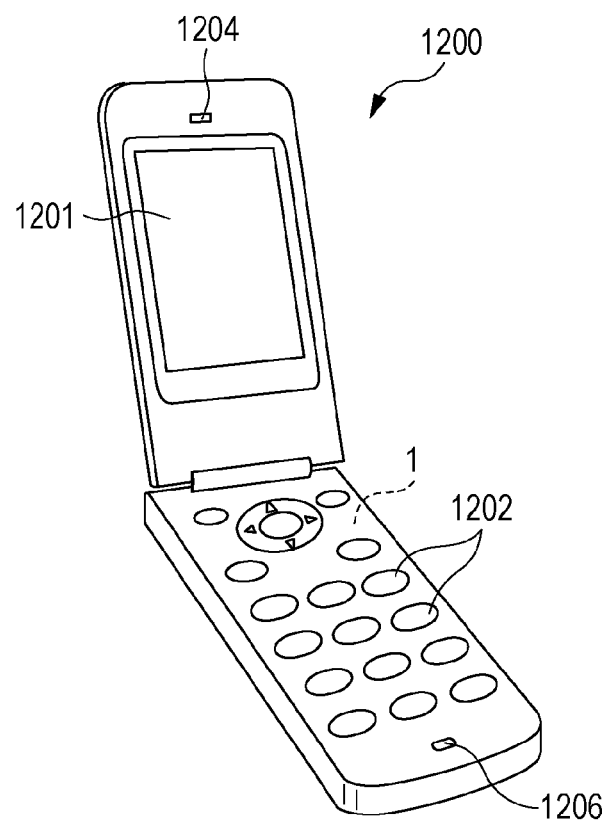
FIG. 14 is a schematic perspective diagram illustrating a configuration of a mobile phone (also including PHS) which functions as an electronic apparatus including an angular velocity sensor.

FIG. 14 is a schematic perspective diagram illustrating a configuration of a mobile phone (also including PHS) which functions as an electronic apparatus including an angular velocity sensor.

As illustrated in FIG. 14, a mobile phone 1200 includes a plurality of operation buttons 1202, a voice receiving hole 1204, and a voice transmitting hole 1206. A display unit 1201 is disposed between the operation buttons 1202 and the voice receiving hole 1204.

The angular velocity sensor 1 (or either 2 or 3) is embedded in the mobile phone 1200.

Figure 15:
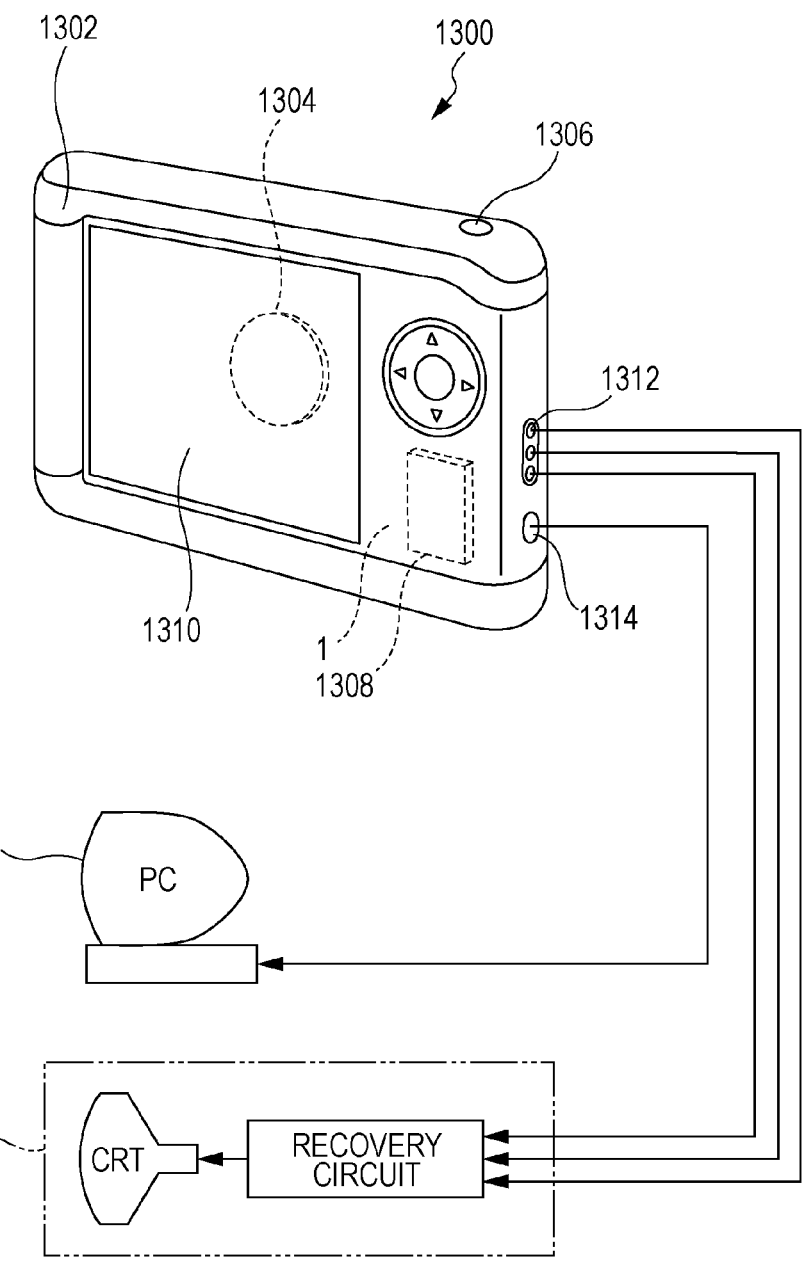
FIG. 15 is a schematic perspective diagram illustrating a configuration of a digital still camera which functions as an electronic apparatus including an angular velocity sensor.

FIG. 15 is a schematic perspective diagram illustrating a configuration of a digital still camera which functions as an electronic apparatus including an angular velocity sensor. A connection to an external device is also illustrated in a simplifying manner in FIG. 15.

Here, a normal camera exposes a silver salt photographic film using an optical image of a subject. In contrast to this, a digital still camera 1300 performs a photoelectric conversion of the optical image of the subject using an imaging element such as a charge coupled device (CCD), and generates an imaging signal (image signal).

A display unit 1310 is provided on a rear surface (a front side in the figure) of a case (body) 1302 of the digital still camera 1300, and is configured to perform display based on an imaging signal of the CCD. The display unit 1310 functions as a finder which displays a subject as an electronic image.

In addition, a light receiving unit 1304 which includes an optical lens (imaging optical system), a CCD, or the like is provided on a front side (a far side in the figure) of a case 1302.

If a photographer checks a subject image which is displayed on the display unit 1310 and pushes a shutter button 1306, an imaging signal of the CCD at that time is transferred to a memory 1308 and is stored there.

In addition, in the digital still camera 1300, a video signal output terminal 1312, and an input and output terminal for data communication 1314 are provided on a side surface of a case 1302. A television monitor 1430 is connected to the video signal output terminal 1312, and a personal computer 1440 is connected to the input and output terminal for data communication 1314, as necessary. Furthermore, the digital still camera 1300 is configured such that an imaging signal which is stored in the memory 1308 is output to the television monitor 1430 or the personal computer 1440 through a predetermined operation.

The angular velocity sensor 1 (or either 2 or 3) is embedded in the digital still camera 1300.

Such an electronic apparatus includes the above-described angular velocity sensor, and thus the effects which are described in the first embodiment, the modification example, and the second embodiment are obtained, and excellent performance can be exhibited.

The electronic apparatus including the above-described angular velocity sensor can be used in, for example, an ink jet type ejecting device (for example, ink jet printer), a laptop type personal computer, a television, a video camera, a video tape recorder, various navigation communication function), an electronic dictionary, an electronic calculator, an electronic game machine, a word processor, a workstation, a videophone, security television monitor, electronic binoculars, a POS terminal, a medical apparatus (for example, an electronic thermometer, a blood pressure monitor, a blood glucose meter, an electrocardiogram measuring device, an ultrasonic diagnostic device, an electronic endoscope), a fish finder, various measuring instruments, gauges, a flight simulator, or the like.

Mobile Object

Next, a mobile object including the above-described angular velocity sensor will be described.

Figure 16:
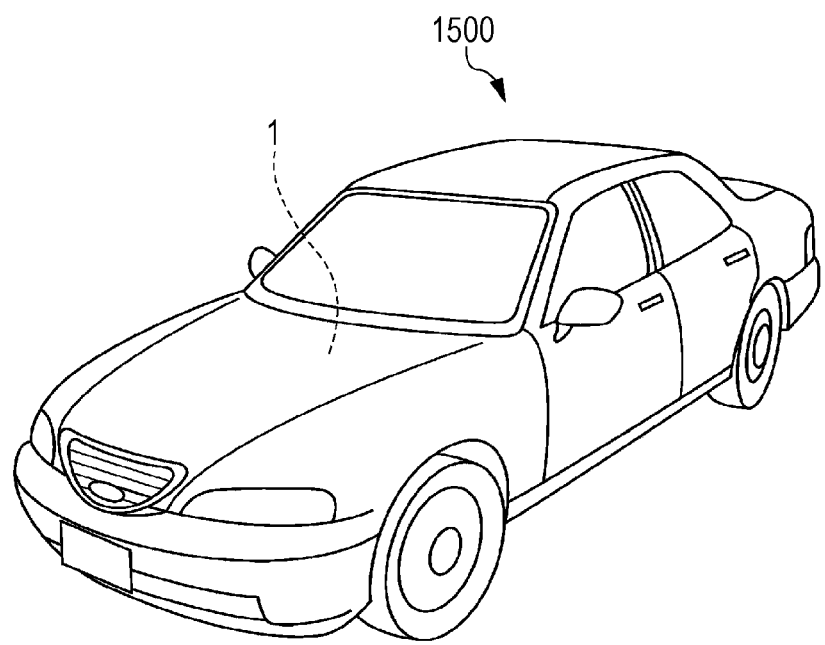
FIG. 16 is a schematic perspective diagram illustrating an automobile, as an example of a mobile object which includes an angular velocity sensor.

FIG. 16 is a schematic perspective diagram illustrating an automobile, as an example of a mobile object which includes an angular velocity sensor.

An automobile 1500 uses the angular velocity sensor (or either 2 or 3), as a navigation device which is mounted thereon, or a posture detection sensor for a posture control device.

Further, the automobile 1500 includes the above-described angular velocity sensor, and thus the effects which are described in the first embodiment, the modification example, and the second embodiment are obtained, and excellent performance can be exhibited.

The above-described angular velocity sensor is not limited to being applied to the automobile 1500, and can be preferably applied to a posture detection sensor, or the like, of a mobile object including a self-propelled robot, a self-propelled transport device, a train, a ship, an airplane, a satellite, or the like. It is possible to provide a mobile object in which the effects which are described in the first embodiment, the modification example, and the second embodiment are obtained, and excellent performance is exhibited.

The entire disclosure of Japanese Patent Application No. 2014-087981, filed Apr. 22, 2014 is expressly incorporated by reference herein.

What is claimed is:

1. An angular velocity sensor comprising:
a substrate;
a plurality of mass units which are disposed above the substrate;
a plurality of coupling units which couple the mass units that are adjacent to each other, among the plurality of mass units, the adjacent mass units being connected to opposing ends of one of the coupling units; and
a plurality of drive units which are disposed above the substrate and are connected to the coupling units,
each of the plurality of drive units having a fixing unit fixed to the substrate, wherein the plurality of drive units respectively drive the mass units that are adjacent to each other through the plurality of coupling units using the fixing unit as a center of the motion, and
each of the plurality of drive units is connected to one of the plurality of coupling units through a moving unit at a location on the coupling unit between the opposing ends.

2. The angular velocity sensor according to claim 1,
wherein the plurality of mass units includes a first mass pair in which two of the mass units are disposed so as to face each other along a first axis, and a second mass pair in which the other two of the mass units are disposed so as to face each other along a second axis that intersects the first axis in a planar view, and
wherein the drive units drive the respective mass units such that the second mass pair is displaced in a direction that separates the pair from each other, when the first mass pair is displaced in a direction that brings the pair toward each other, and such that the second mass pair is displaced in a direction that brings the pair toward each other, when the first mass pair is displaced in a direction that separates the pair from each other.

3. The angular velocity sensor according to claim 2,
wherein at least one of the mass units of the first mass pair includes a first detection unit which detects angular velocity of a second axis rotation,
wherein at least one of the mass units of the second mass pair includes a second detection unit which detects angular velocity of a first axis rotation, and
wherein at least one mass unit of at least one of the first mass pair and the second mass pair includes a third detection unit which detects angular velocity of a third axis rotation which intersects a flat plane along the first axis and the second axis.

4. The angular velocity sensor according to claim 3,
wherein each of the coupling units is formed in an arc shape having a center between the mass units that are adjacent to each other,
wherein each of the drive units includes a fixing unit that includes the center of the arc shape and is fixed to the substrate and a moving unit which connects the fixing unit to one of the coupling units, and
wherein the moving unit and the coupling unit can rotate using the fixing unit as a center.

5. The angular velocity sensor according to claim 4,
wherein each of the drive units includes a fixing electrode which is provided above the substrate and a moving electrode which is provided in the moving unit,
wherein the fixing electrode and the moving electrode include electrode fingers which mesh with each other and have a comb tooth shape, and
wherein the electrode fingers are formed in an arc shape having the fixing unit as a center.

6. The angular velocity sensor according to claim 3,
wherein each of the coupling units includes a stress reduction unit in a connection unit between the coupling unit and the mass unit to which the coupling unit is attached.

7. The angular velocity sensor according to claim 3,
wherein at least one of the plurality of mass units includes a monitoring unit which monitors displacement of the mass unit at the time of driving.

8. The angular velocity sensor according to claim 2,
wherein each of the coupling units is formed in an arc shape having a center between the mass units that are adjacent to each other,
wherein each of the drive units includes a fixing unit that includes the center of the arc shape and is fixed to the substrate and a moving unit which connects the fixing unit to one of the coupling units, and
wherein the moving unit and the coupling unit can rotate using the fixing unit as a center.

9. The angular velocity sensor according to claim 8,
wherein each of the drive units includes a fixing electrode which is provided above the substrate and a moving electrode which is provided in the moving unit,
wherein the fixing electrode and the moving electrode include electrode fingers which mesh with each other and have a comb tooth shape, and
wherein the electrode fingers are formed in an arc shape having the fixing unit as a center.

10. The angular velocity sensor according to claim 2,
wherein each of the coupling units includes a stress reduction unit in a connection unit between the coupling unit and the mass unit to which the coupling unit is attached.

11. The angular velocity sensor according to claim 2,
wherein at least one of the plurality of mass units includes a monitoring unit which monitors displacement of the mass unit at the time of driving.

12. The angular velocity sensor according to claim 1,
wherein at least one of the plurality of mass units includes a monitoring unit which monitors displacement of the mass unit at the time of driving.

13. The angular velocity sensor according to claim 12,
wherein each of the coupling units is formed in an arc shape having a center between the mass units that are adjacent to each other,
wherein each of the drive units includes a fixing unit that includes the center of the arc shape and is fixed to the substrate and a moving unit which connects the fixing unit to one of the coupling units, and
wherein the moving unit and the coupling unit can rotate using the fixing unit as a center.

14. The angular velocity sensor according to claim 13,
wherein each of the drive units includes a fixing electrode which is provided above the substrate and a moving electrode which is provided in the moving unit,
wherein the fixing electrode and the moving electrode include electrode fingers which mesh with each other and have a comb tooth shape, and
wherein the electrode fingers are formed in an arc shape having the fixing unit as a center.

15. The angular velocity sensor according to claim 1,
wherein each of the coupling units is formed in an arc shape having a center between the mass units that are adjacent to each other,
wherein each of the drive units includes a fixing unit that includes the center of the arc shape and is fixed to the substrate and a moving unit which connects the fixing unit to one of the coupling units, and wherein the moving unit and the coupling unit can rotate using the fixing unit as a center.

16. The angular velocity sensor according to claim 15, wherein each of the drive units includes a fixing electrode which is provided above the substrate and a moving electrode which is provided in the moving unit,
wherein the fixing electrode and the moving electrode include electrode fingers which mesh with each other and have a comb tooth shape, and
wherein the electrode fingers are formed in an arc shape having the fixing unit as a center.

17. The angular velocity sensor according to claim 1, wherein each of the coupling units includes a stress reduction unit in a connection unit between the coupling unit and the mass unit to which the coupling unit is attached.

18. An electronic apparatus comprising:
the angular velocity sensor according to claim 1.

19. A mobile object comprising:
the angular velocity sensor according to claim 1.

20. An angular velocity sensor comprising:
a substrate;
a plurality of mass units which are disposed above the substrate;
a plurality of coupling units which couple the mass units that are adjacent to each other, among the plurality of mass units, the adjacent mass units being connected to opposing ends of one of the coupling units;
a plurality of drive units which are disposed above the substrate; and
each of the plurality of drive units having a fixing unit fixed to the substrate,
wherein each of the plurality of drive units is connected to a corresponding one of the coupling units respectively, and
each of the plurality of drive units directly drives the corresponding one of the plurality of coupling units to vibrate the mass units through the corresponding coupling unit using the fixing unit as a center of the motion.

21. An angular velocity sensor comprising:
a substrate;
a first mass unit connected to a first fixing unit via a first spring, the first fixing unit fixed to the substrate;
a second mass unit connected to a second fixing unit via a second spring, the second fixing unit fixed to the substrate;
a first coupling unit connecting the first mass unit and the second mass unit;
a first drive unit connected to a third fixing unit fixed to the substrate and connected to the first coupling unit; wherein
the first drive unit directly drives the first coupling unit to vibrate the first mass unit and the second mass unit using the first fixing unit as a center of motion.

22. The angular velocity sensor according to claim 21 comprising:
a third mass unit connected to a fourth fixing unit via a third spring, the fourth fixing unit fixed to the substrate;
a fourth mass unit connected to a fifth fixing unit via a fourth spring, the fifth fixing unit fixed to the substrate;
a second coupling unit connecting the second mass unit and the third mass unit;
a third coupling unit connecting the third mass unit and the fourth mass unit;
a fourth coupling unit connecting the fourth mass unit and the first mass unit;
a second drive unit connected to a sixth fixing unit fixed to the substrate and connected to the second coupling unit;
a third drive unit connected to a seventh fixing unit fixed to the substrate and connected to the third coupling unit; and
a fourth drive unit connected to an eighth fixing unit fixed to the substrate and connected to the fourth coupling unit, wherein
the second drive unit directly drives the second coupling unit to vibrate the second mass unit and the third mass unit,
the third drive unit directly drives the third coupling unit to vibrate the third mass unit and the fourth mass unit, and
the fourth drive unit directly drives the fourth coupling unit to vibrate the fourth mass unit and the first mass unit.

* * * * *